United States Patent
Adames

[11] Patent Number: 5,939,808
[45] Date of Patent: Aug. 17, 1999

[54] ELECTRIC MOTOR HOUSING WITH INTEGRATED HEAT REMOVAL FACILITIES

[76] Inventor: Fermin Adames, 607 N. Central Ave., Wood Dale, Ill. 60191

[21] Appl. No.: 09/089,610

[22] Filed: Jun. 3, 1998

[51] Int. Cl.$^6$ ..................................................... H02K 5/00
[52] U.S. Cl. ............................... 310/89; 310/54; 310/58; 310/59; 310/60
[58] Field of Search ................................. 310/54, 58, 59, 310/60, 89

[56] References Cited

U.S. PATENT DOCUMENTS 5,798,587  8/1998  Lee ............................................. 310/58

*Primary Examiner*—Nestor Ramirez
*Assistant Examiner*—Thanh Lam
*Attorney, Agent, or Firm*—Laff, Whitesel & Saret, Ltd.

[57] ABSTRACT

An improved cast motor housing for medium to large motors is integrally formed with at least one conduit embedded in the housing for carrying a circulating heat removal fluid. The housing has a substantially cylindrical housing wall formed from a thermally conductive material. The fluid conduit is disposed within the housing wall intimate thermally-conductive contact with the wall material. The conduit may be formed of a sturdy, thermally conductive material. The conduit is arranged within the housing wall to extend along substantially the entire longitudinal and circumferential dimensions of the housing, and may be formed as a multi-turn helix. For larger motors, multiple conduits may be provided. The motor housing is formed by casting. A cylindrical casting core has a set of longitudinally-extending channels located at regular angular intervals along its circumference for supporting the conduit during the casting process. The resultant housing may be substituted for conventionally produced housings in the construction of motors. In operation, fluid is circulated through the motor housing to absorb heat, and then circulated through a heat exchanger to expel the heat.

2 Claims, 10 Drawing Sheets

ELECTRIC MOTOR HOUSING WITH INTEGRATED HEAT REMOVAL FACILITIES

This application is a continuation of U.S. patent application Ser. No. 08/462,202, filed on Jun. 5, 1995, which remains pending.

BACKGROUND OF THE INVENTION

This invention relates to electric motors, and more particularly, to apparatus for removing heat from high-power electric motors, in which at least a portion of the heat removal system is integrated in a housing of the motor, and to methods for constructing such motors.

A variety of electric motors have long been used in industrial applications, and many techniques have been developed to remove the heat produced by such motors. However, a class of electric motors, which are often referred to as "Brushless DC" motors, have recently become the preferred motor for use in many electrically-powered industrial drive systems. Although motors of this class provide several advantages over other motor types, they also present special heat removal challenges.

A significant advantage of brushless DC motors over many other types of motors is that the motor's speed can be accurately variably controlled over a wide range of speeds and load conditions, throughout which the motor can produce full, or nearly full rated torque. For example, a typical brushless DC motor may produce 90 percent of its maximum rated torque at speeds as low as five percent of the motor's maximum speed. Although variable-speed motors have long been known, prior variable-speed motor technologies have generally not produced nearly full rated torque at small fractions of a motor's maximum speed. For typical motors, output torque, and other measures of useful output, drop dramatically as speed is reduced. As a result, when an application required a variable speed motor to produce high torque at low speed, a motor capable of greater output than needed at normal speeds was often selected in order to provide sufficient output at very low speeds.

Although the practice of selecting an oversized motor for such applications is generally undesirable, it does provide advantages in coping with the waste heat produced during motor operation. An oversized motor is typically operated at a smaller fraction of its maximum output or duty cycle, thereby reducing its heat production in comparison to what was contemplated by its designers for full-load operation. In addition, higher capacity motors are physically large. This limits the number of motors which may be employed in machinery of a given volume. Also, larger motors have greater internal mass and external surface area over which heat produced in the motor may be distributed. The conventional method of cooling medium-to-large electric motors used in industrial equipment is to direct a forced air stream at the exterior surface of the motor. The rate at which heat is removed from the motor depends in large part on the surface area available for contact with the air stream.

The availability of variable-speed DC brushless motors capable of high output across a wide speed range allows equipment designers to specify smaller capacity motors compared to those required when other technologies are used. Such applications present special heat-removal challenges. Because the motors are physically smaller, all the heat produced must be removed from a smaller surface area. Also, more motors can fit into a given volume within an equipment enclosure. Further, when lower-capacity motors are used, they must operate at a higher fraction of their full-load output or maximum duty cycle. As a result, waste heat must be removed efficiently to avoid an excessive temperature increase which could damage the motor or the equipment in which it is installed, and could cause a fire or other safety hazard.

As noted above, a preferred conventional method of cooling medium-to-large electric motors used in common industrial equipment is to direct a forced air stream at the exterior surface of the motor. Although this method may be effective, it has several disadvantages. Since the air stream must actually contact the motor exterior surface, substantial space must be provided around the motor to permit rapid air movement. Normally, a blower or fan is used to move the cooling air. Because DC brushless motors may be required to operate at low speed, the motor cannot drive its own blower, and therefore, a smaller but not-insignificant additional motor is typically provided to drive the blower or fan blade. The additional motor requires energy and space and generates still more heat. Since air is not an efficient coolant in comparison with other cooling materials, the cooling air must strike the motor surface and circulate around it at relatively high velocity.

As a result, in order to obtain the desired velocity of air, high-velocity blowers must be used, and these blowers must be placed relatively close to the motor to be cooled. A substantial amount of space must be provided around each motor to allow enough air circulation. These consequences of using forced air cooling limit the density of the equipment in the region of the motors. The blowers produce high-intensity noise, which may be hazardous to human workers in the vicinity. In addition, the blowers have rapidly moving mechanical components, which may also be hazardous to workers. Thus, when blowers are used, special care must be taken to comply with occupational safety and health regulations.

In addition, the cooling air must be drawn from and returned to the environment surrounding the equipment. Industrial facilities are rarely perfectly clean, and thus, the environmental cooling air often carries particulates which may contaminate the product being manufactured or processed, or the equipment itself. Although filtration of the air may be attempted, such filtration may not be completely effective. Further, there are some environments in which blowers may be especially hazardous. For example, in some mining and materials processing operations, an explosive atmosphere may be caused by an explosive gas or by suspended particles in the air which may ignite or explode, and rapid air movement may be undesirable.

It is generally desirable to operate motors at low internal and external temperatures (e.g., approximately room temperature), to minimize the risk of mechanical and electrical failures which are promoted by higher temperatures. However, it is difficult in practice to accomplish this. Although improved cooling performance can generally be obtained by increasing the volume and velocity of the circulating air, the initial cost, operating cost, space requirements, and other factors associated with larger air movement equipment limits the additional cooling which can be feasibly achieved in this way. Thus, even with forced air cooling, the exterior temperature of the housing of a typical motor in industrial equipment may be high enough to cause a burn if the housing is touched.

Another disadvantage of using blowers to cool motors is that the heat produced within the motor must be conducted to the outermost surface of the motor housing before it may be transferred to the cooling air. Conventionally, blower-cooled motors have been provided with a plurality of cooling fins to increase their surface area, thereby providing improved thermal transfer between the housing and the cooling air. The additional fin structure increases the mass, material cost, and space requirements of the motor. Further, although the materials (such as aluminum) typically used to form motor housings are thermally conductive, they are not perfectly conductive, and present some thermal resistance. To avoid undesirably high motor operating temperatures in general, and to avoid "hot spots" in particular, the exterior geometries selected for housings of blower-cooled motors is limited to those which provide sufficient total cooling, and those which are sufficiently uniform to avoid localized "hot spots." As a result, most housings for air-cooled motors are approximately cylindrical, even though other exterior shapes would be preferred if cooling were not an issue.

Several other methods have also been used to cool motors, but these too have their disadvantages. According to one known cooling method, a cooling jacket is attached to the exterior of the motor housing. The cooling jacket has one or more circuitous passages through which a liquid coolant flows. The circuitous passages are formed between a pair of sheet members which are joined in various locations to create interstitial passages and are cylindrically constructed to substantially conform to the shape of the housing.

Because the jacket is constructed of plate members which must be joined together to form the interstitial passages, the manufacture of the jacket is fairly complex. In addition, it is difficult to permanently prevent leakage throughout the intended operating life of the motor. Since coolant liquids may be conductive and may chemically attack certain materials, even minute leakage of coolant in or around the motor may result in a catastrophic failure of the motor and may cause a personal safety hazard. Also, the jacket is, in essence, a separate assembly which must be installed on the exterior of the motor housing. This separate installation increases cost and complexity.

Further, it is difficult to install the jacket on the exterior of the motor housing such that the housing and the jacket are in continuous contact along their entire adjacent surfaces, thereby forming a highly-thermally-conductive interface therebetween. Voids between the housing and the jacket reduce the overall cooling efficiency, and create localized regions of high temperature (i.e., "hot spots" ) which may cause the failure of insulation or other motor components. In addition, the range of available housing shapes is limited to those for which a conformal jacket may be produced and subsequently conveniently installed on the housing. Thus, for motor housings having an exterior cross-section which is not exactly circular, the jacket may be unusable. For most medium to large motors, although the housing cross section is generally circular, the circular shape is typically modified to provide mounting feet or other support structures, or to provide attachment surfaces for control equipment and the like. Thus, in many motor applications, the cooling jacket of the prior art may not be advantageously applied.

Another known method of cooling electric motors and other rotating electrical machines (such as generators) is to form passages for carrying a cooling fluid on an interior surface of the motor housing itself. This has typically been accomplished by casting, machining, or stamping a suitable pattern of indentations or channels on the interior structural wall of the housing. A cooperating closure, such as a suitably shaped plate member, is placed over the indentations or channels to complete the passages and prevent the fluid from escaping. This method also has several disadvantages which prevent it from being usefully applied to medium to large scale DC brushless motors.

One problem is that it is difficult to create a leak-proof seal between the closure and the housing. Motors are subject to vibration and large mechanical stresses which cause some structural deflection during operation. In at least one prior art device, the housing is essentially cylindrical, and the mating closure member is also cylindrical and is telescopically arranged therein. Such mechanical arrangements require that the closure and housing be sealed at each end of the motor over the entire circumference of the closure-to-housing interface. For motors of medium to large size, a seal along such a large circumference which remains permanently reliable despite vibration, mechanical deflection of the housing, and many thermal expansion and contraction cycles, is difficult to form. Further, the cooling fluid channels of prior art motors and the closure plate member covering the interior surface of the housing are believed to degrade the structural integrity of the housing.

In addition, it is believed that providing an interior closure member to be applied to the inside of the motor housing is incompatible with an aspect of the modern preferred techniques of constructing DC brushless motors. Typically, housings of such motors are formed with an inside diameter which is slightly smaller than the outside diameter of the stator winding assembly at normal operating temperatures. The stator winding assembly is permanently secured in the motor housing by heating the housing well above normal operating temperatures to cause thermal expansion, inserting the stator winding assembly into the proper position in the housing cavity, and allowing the housing to cool. As the housing cools, it contracts around the stator winding assembly to produce a secure "compression-fit" engagement between the housing and the winding. This engagement is essential because all of the motor's output torque is transferred from the stator winding assembly to the housing at this interface. This construction method complicates the problem of a seal between an interior closure and the motor housing, because the large forces produced by the stator winding-to-motor housing compression fit would tend to deform the closure. Variable torques applied at this interface during motor operation further exacerbate this problem.

In addition, the cooling fluid passages may be difficult to form on the interior wall surface of a complete cylinder. Accordingly, in at least one case, the motor housing has been formed from two mating semi-cylindrical components with suitable mating plate-like closures. The semi-cylindrical housing components are later joined in a clam-shell arrangement. It is believed that this construction is particularly disadvantageous in DC brushless motor applications because another means must be provided to permanently secure the stator winding assembly to the housing components.

OBJECTS AND SUMMARY OF THE INVENTION

It is therefore an object of the present invention to provide an electric motor or other heat producing machine having integral heat-removal facilities which avoid the aforementioned disadvantages of the prior art.

It is another object of the invention to provide an electric motor or other heat producing machine which does not require forced air cooling in the region surrounding the motor.

It is a further object of the invention to provide an electric motor which does not require the use of high-velocity blowers in the region surrounding the motor.

It is a another object of the invention to provide methods and apparatus for cooling an electric motor which reduces noise and particulate contamination in comparison with prior art cooling methods.

It is a further object of the invention to provide a housing suitable for use in constructing heat producing machines which housing provides integral heat-removal facilities.

It is another object of the invention to provide a housing suitable for use in constructing DC brushless motors having formed integrally therein at least one channel for carrying a cooling fluid.

It is a further object of the invention to provide a housing suitable for use in constructing heat producing machines having formed integrally therein at a cooling fluid channel without substantially degrading the structural integrity of the housing.

It is another object of the invention to provide a housing suitable for use in constructing heat producing machines which provides an integral heat removal facility such that the exterior shape of the housing is substantially irrelevant to cooling.

It is a further object of the invention to provide a housing suitable for use in constructing heat producing machines which provides an integral heat removal facility such that heat is removed substantially uniformly throughout a designated portion of the housing and "hot spots" are avoided.

It is another object of the invention to provide a method for constructing such housings.

A housing constructed according to the present invention for use in a heat-producing machine (such as an electric motor or generator) comprises a substantially cylindrical housing wall formed from a thermally conductive material, such as an aluminum alloy. However, other materials, such as a thermally conductive polymer, could also be used. At least one cooling-fluid-carrying conduit is disposed within the housing wall in intimate thermally-conductive relation thereto, at locations intermediate the interior and exterior surfaces of the housing wall. A heat-removal fluid is circulated through the conduit to absorb heat from the housing wall, and is subsequently circulated to a device to expel the heat. The present invention is described in the exemplary environment of an electric, brushless DC motor which may be used in a drive system for manufacturing equipment or the like. However, it may also be used in other applications in which heat must be removed from a machine contained in a housing.

The conduit may be formed of a sturdy, thermally conductive material, which will not be adversely affected by the process of casting the housing. For a housing formed of cast aluminum, a stainless steel alloy tubing may be used. The conduit is arranged within the housing wall to extend along substantially the entire longitudinal dimension of the housing, or at least the heat producing components of the motor. In addition, the conduit is arranged within the housing wall to extend along substantially its entire circumference. This permits rapid heat transfer between the housing and the cooling fluid of the conduit.

In a preferred embodiment, the conduit is formed as a multi-turn helix disposed concentrically within the cylindrical housing wall, but other conduit configurations may also be used. The conduit extends from the housing to an input port and an output port so that cooling fluid may be introduced into and removed from the conduit. For larger machines, multiple conduits may be provided. The additional conduits ensure that sufficient cooling is available and reduce the problem of uneven cooling caused when the cooling fluid temperature rises as it travels from the input end of the conduit to the output end. The additional conduits may be arranged longitudinally adjacent to one another. Alternatively, several conduits may be interspersed with one another (for example, in a "double-helix" configuration similar to the structure of DNA). The conduits may have a consistent pitch, or the pitch may be varied to provide enhanced cooling to selected regions.

In a preferred method of construction, the motor housing is formed by casting. A substantially cylindrical casting core is provided to define the cast interior surface of the housing. A set of longitudinally-extending conduit supports are attached to the core at regular angular intervals along its circumference. The supports may be formed as channels or rails extending from the core and serve to fix the conduit, in a desired position spaced from the core, and in all other dimensions, during casting. Thus, the supports must be constructed of a material which will not be adversely affected by the casting process. For example, where the housing is formed of cast aluminum, the supports must have a higher melting point than the casting metal, and are preferably perforated to allow casting metal to form a voidless matrix surrounding the supports and the conduit. However, the housing could also be formed using other materials and methods. In particular, a sturdy, thermally conductive polymer material could also be used, and could be cast or otherwise formed using any appropriate method. For example, if a polymer were used, the housing could be formed using high temperature casting, room temperature casting, sintering, extrusion, or any other suitable technology.

The conduit is formed in a desired configuration, such as a helix with suitable input and output connectors, and is secured to the supports. The remaining casting mold structure is formed around the core and conduit assembly. The housing is then cast using any suitable method. Later, the interior of the housing is machined to a desired inner diameter and surface finish. Suitable motor supports, such as motor feet, and other useful structures, may be incorporated in the casting. The resultant housing may be substituted for conventionally produced housings in the construction of motors.

In assembling the motor, it is desirable to permanently secure the stator winding assembly in the housing in an intimate, thermally-conductive relationship. The inner diameter of the housing is slightly smaller than the outer diameter of the stator winding assembly. During motor assembly, the motor housing is heated to a temperature well above normal operating temperatures, causing thermal expansion of its inner wall surface. Heating produces sufficient thermal expansion that the inner diameter of the motor housing temporarily becomes larger than the outer diameter of the stator winding assembly. The stator winding assembly is then inserted into the proper position in the cavity of the housing, and the housing is allowed to cool to normal temperatures. As the housing cools, it contracts around the stator, producing a secure compression/shrink fit engagement between the cavity of the housing and the stator winding assembly. This process eliminates essentially all air gaps and other voids between the inner housing wall and the stator winding assembly. This compression engagement provides high thermal conductivity, allowing substantially all of the heat generated by the stator winding assembly to be conductively transferred from the stator to the housing wall, and then to the heat-removal fluid circulating in the conduits therein.

In operation, cooling fluid is pumped through the motor housing cooling conduit and absorbs heat produced by the motor. The heat-laden fluid is transported to a heat exchanger, where the absorbed heat is removed. The fluid is then returned for recirculation through the conduit. The heat exchanger and pump may be distant from the motor.

The present invention provides numerous advantages over the prior art techniques for cooling motors and other heat producing machines. The inventive housing advantageously provides improved cooling for DC brushless motors (or other machines) and avoids the problems experienced using prior-art forced-air and liquid cooling methods. As a result of the high-thermal-conductivity interfaces between the stator winding assembly and the housing wall, and between the housing wall material to the heat-removal conduit and circulating fluid, the inventive motor housing advantageously provides very high cooling rates compared to prior art housings. Motors produced using the inventive housing operate at lower external and internal temperatures, improving operator safety, motor reliability and lifespan. Such motors may be cooled remotely and may be applied in higher density applications.

Drive systems, motors, and or other heat producing machines produced with housings constructed according to the present invention advantageously avoid the need for high-velocity cooling blowers in the vicinity of the equipment. The invention thus eliminates the noise pollution, dust and particulate contamination, and occupational safety hazards associated with the blowers. The invention further provides a housing which may be used in environments in which a blower-cooled motor would be undesirable. For example, in applications where an explosive atmosphere renders a high-velocity blower a safety hazard, elimination of blowers may eliminate or ameliorate the hazard. Because the invention eliminates the need for forced air cooling in the vicinity of the motor, a large space are not required around the motor to allow air circulation. As a result, motors produced according to the invention may be packed more tightly in equipment, reducing the size and cost of the equipment. The invention also advantageously eliminates the need for cooling fins on the exterior of the motor housing, further reducing the space requirements and material cost of the motor.

Unlike some prior art external cooling jackets, the inventive housing, including the heat-removal conduit, is constructed as an integrated unit. This advantageously eliminates the need to install a cooling jacket around the motor housing after the housing is manufactured. Further, because the heat removal conduit is formed as an integral part of the housing, the invention provides a high-thermal-conductivity path between the housing and the heat removal fluid. This eliminates the problem of the prior art external cooling jackets, in which a high-thermal-conductivity interface between the motor housing and the cooling jacket was difficult or impossible to achieve. Another advantage of the invention is that the exterior shape of the housing need not be limited to those on which an external cooling jacket may be conveniently installed.

Further, because the housing itself is constructed essentially as a single piece, it retains its structural integrity, and it is compatible with preferred techniques of constructing brushless DC motors, in which a stator winding assembly is secured in the the housing using a high-compression interference fit. The invention thus provides significant advantages over prior-art multiple-piece or clam-shell type housings, because there is no need to tightly fasten plural non-cylindrical structural members to form a cylindrical structure for securing the stator winding and other components.

The inventive housing does not suffer from degraded structural integrity because the conduit is small compared to the housing wall thickness and is disposed within the interior and exterior housing wall surfaces at an intermediate, non-structurally critical location. The preformed, sturdy conduit with standard external connections minimizes leakage of coolant and avoids the need for large circumferential seals applied to the inner surface of the housing. The housing is relatively easy to manufacture.

According to the invention, the helical design of the conduit provides consistent cooling along essentially the entire length and circumference of the housing (or of a predefined subregion of the housing which is to be cooled). Thus, the inventive housing advantageously avoids regions of uneven cooling ("hot spots") which could cause internal motor temperatures to rise, and could result in motor failure. Because the conduit provides such large heat removal capacity, and is located at an intermediate position within the housing wall, it is generally not necessary for the outer portion of the housing wall (i.e., that portion radially outside the cylinder formed by the conduit) to conduct a substantial amount of heat. Thus, the invention advantageously provides a housing which may have an external shape selected substantially without regard to cooling requirements. Accordingly, the exterior shape or configuration may be any suitable shape or cross-section, including cylindrical, square, hexagonal, octagonal cross sections, without degrading cooling performance.

BRIEF DESCRIPTION OF THE DRAWINGS

These and other features of this invention will be best understood by reference to the following detailed description of a preferred embodiment of the invention, taken in conjunction with the accompanying drawings, in which.

DETAILED DESCRIPTION OF THE PREFERRED EMBODIMENT

A first preferred embodiment 200 of a housing for a heat-producing machine, such as an electric brushless DC motor, constructed according to the present invention is shown generally in FIGS. 1–4. The present invention is described further herein in the environment of an electric, brushless DC motor which may be used in a drive system for manufacturing equipment or the like. However, this environment is described herein solely as an example of an environment in which the invention may be used. One of ordinary skill in the art will appreciate that the invention may also be used in a wide variety of other applications in which heat must be removed from a machine contained in a housing.

Figure 1:
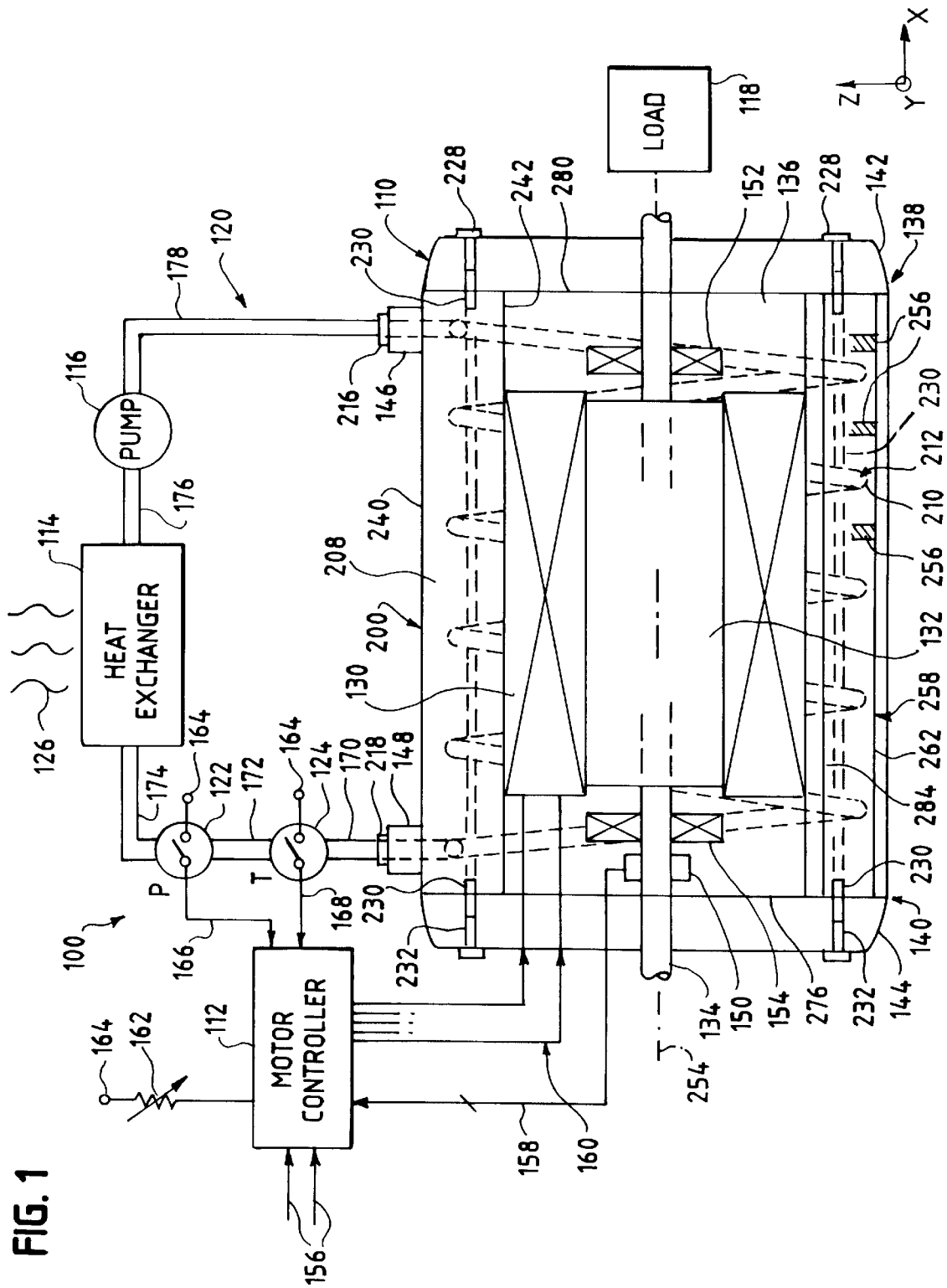
FIG. 1 is a simplified schematic and cross-sectional diagram showing a first embodiment of a motor housing constructed according to the present invention including an integrated heat removal channel, and further showing how the inventive housing may be employed according to another aspect of the invention to form a motor drive system in an exemplary application environment.
Figure 2:
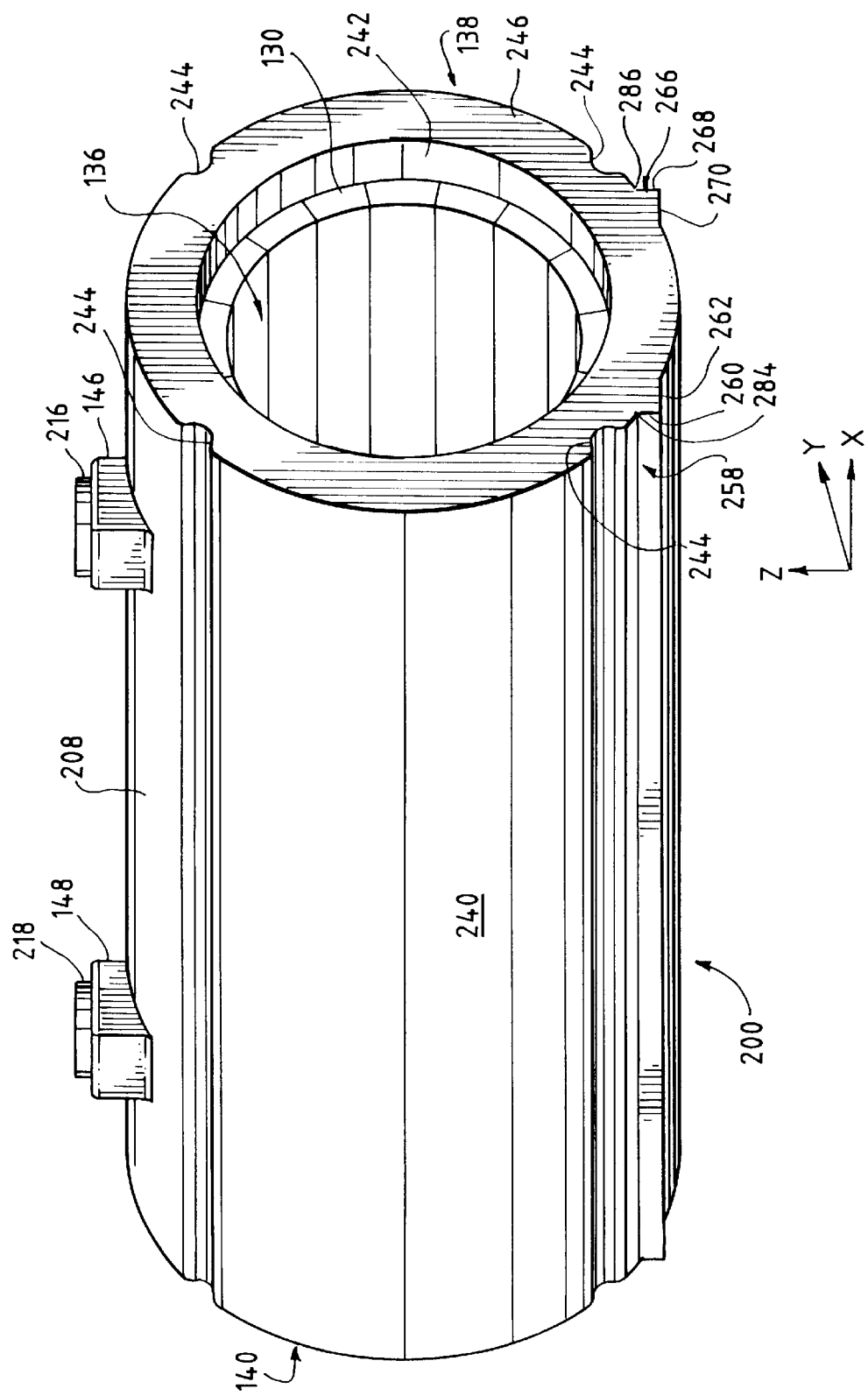
FIG. 2 is an oblique side perspective view of a first embodiment of a motor housing constructed according to the present invention showing a stator winding assembly in place therein.
Figure 3:
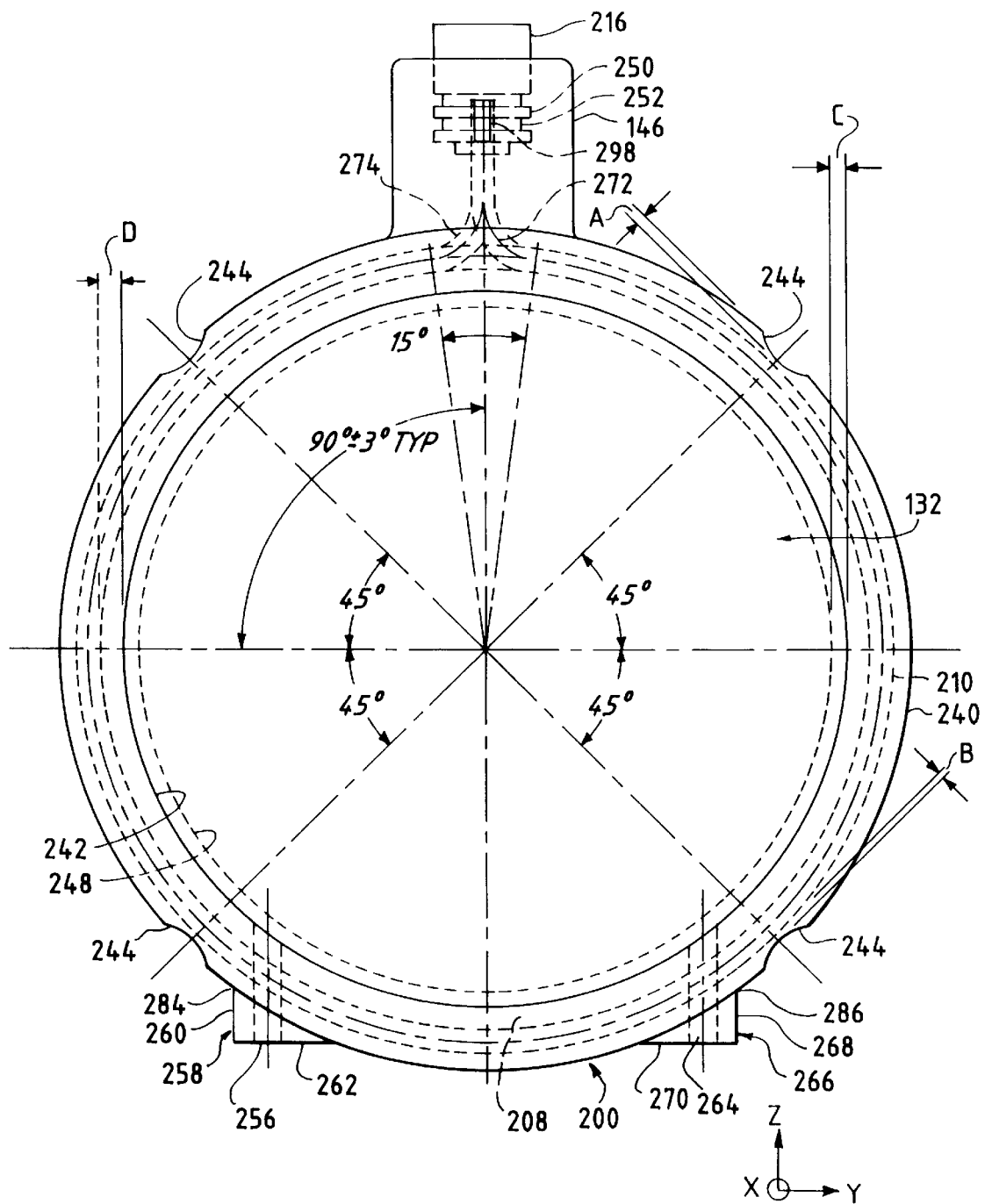
FIG. 3 is an end cross-section view of the housing of FIG. 2, taken along the view lines 3—3 thereof.
Figure 4:
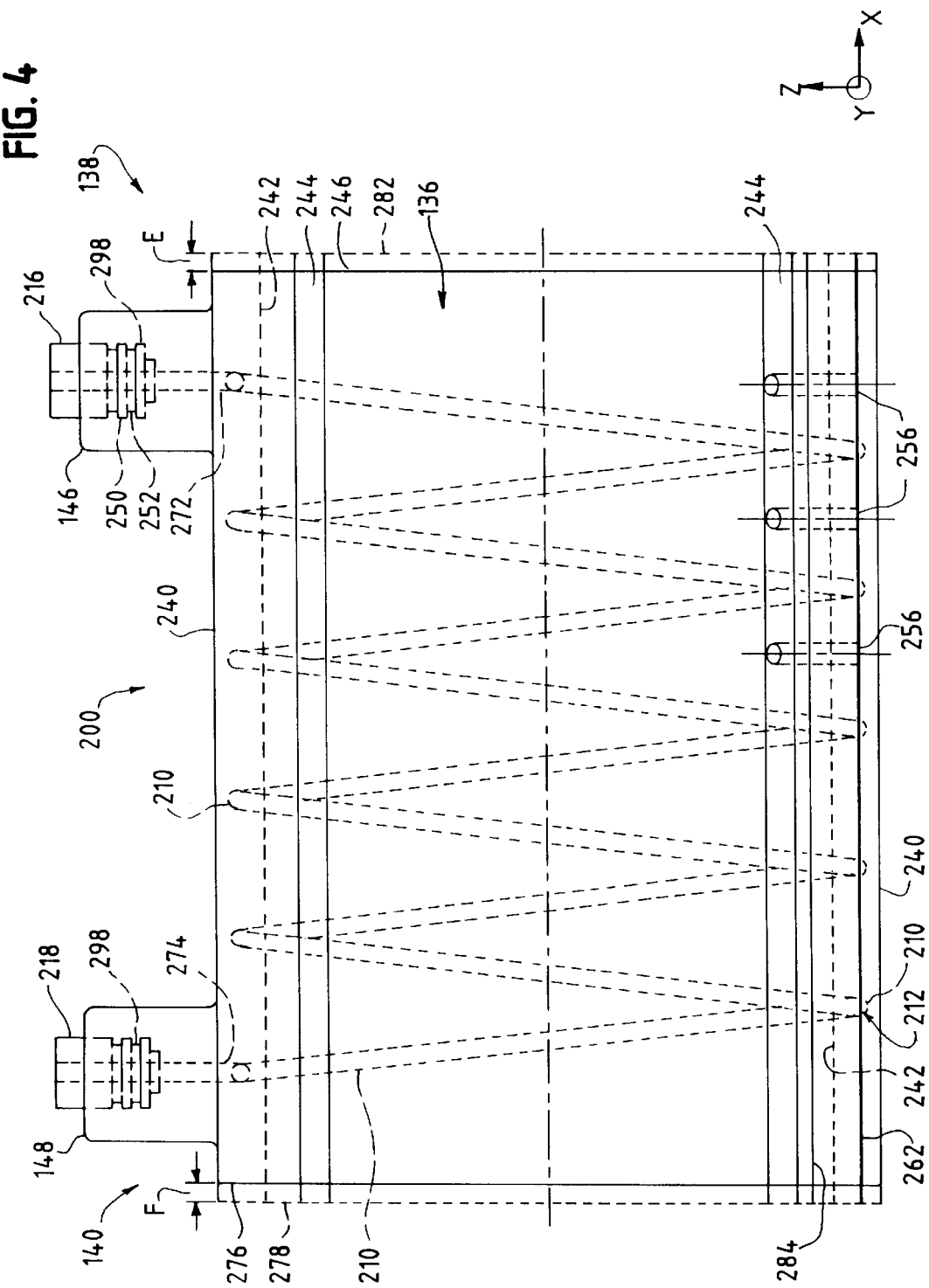
FIG. 4 is a side cross-section view of the housing of FIG. 2, taken along the view lines 4—4 thereof.
Figure 5:
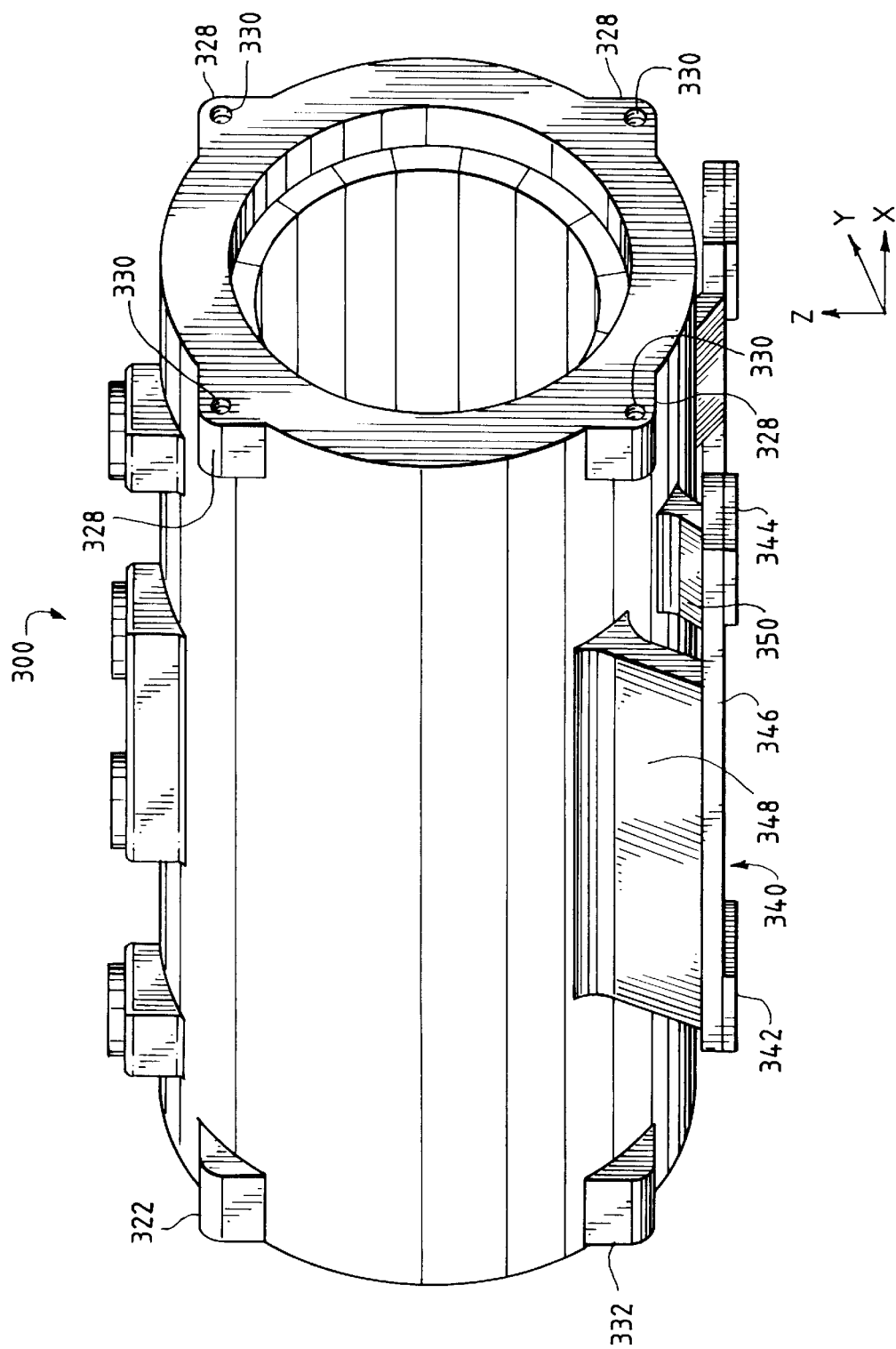
FIG. 5 is an oblique side perspective view of a second embodiment of a motor housing constructed according to the present invention showing a stator winding assembly in place therein.
Figure 6:
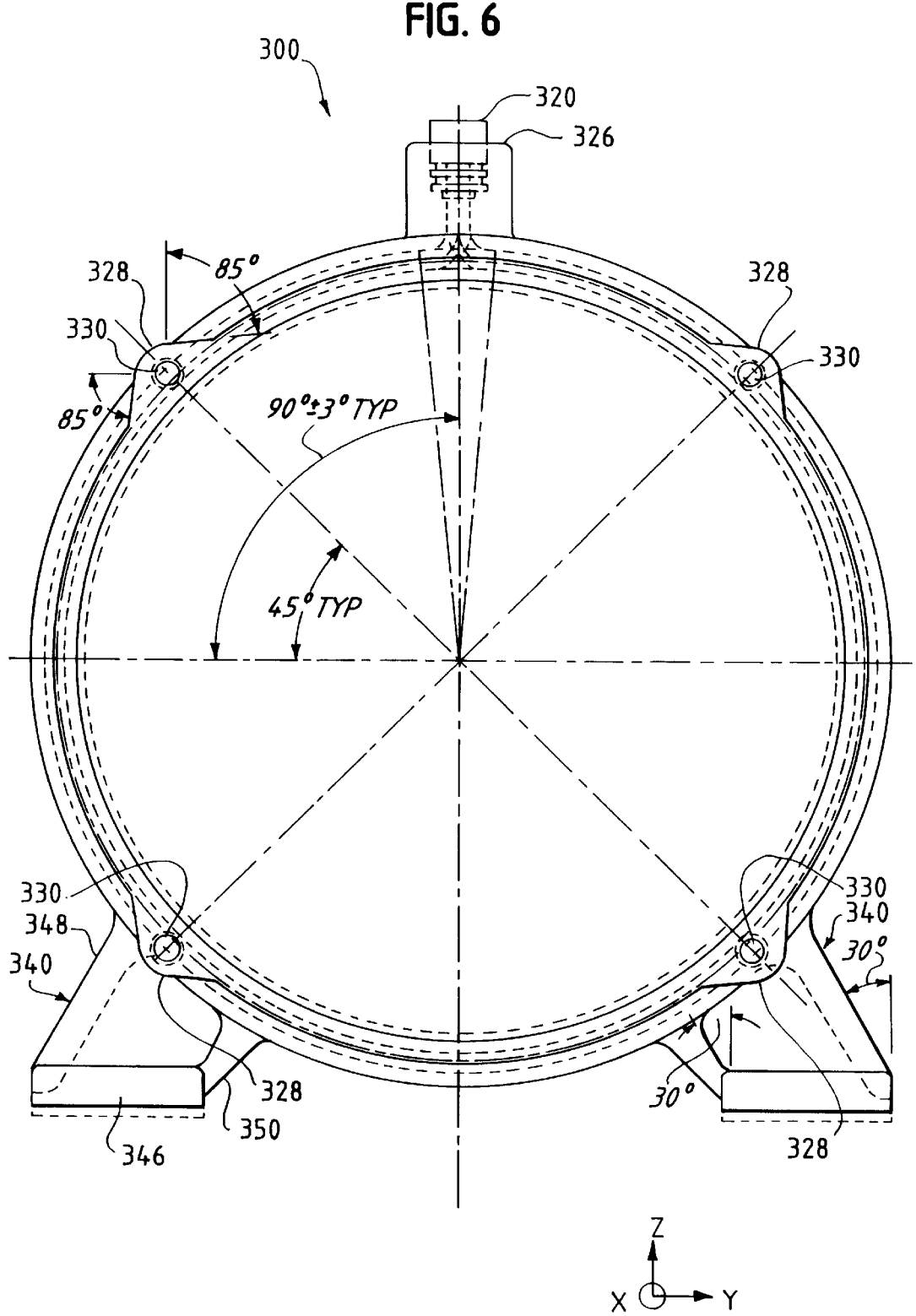
FIG. 6 is an end cross-section view of the housing of FIG. 5, taken along the view lines 6—6 thereof.
Figure 7:
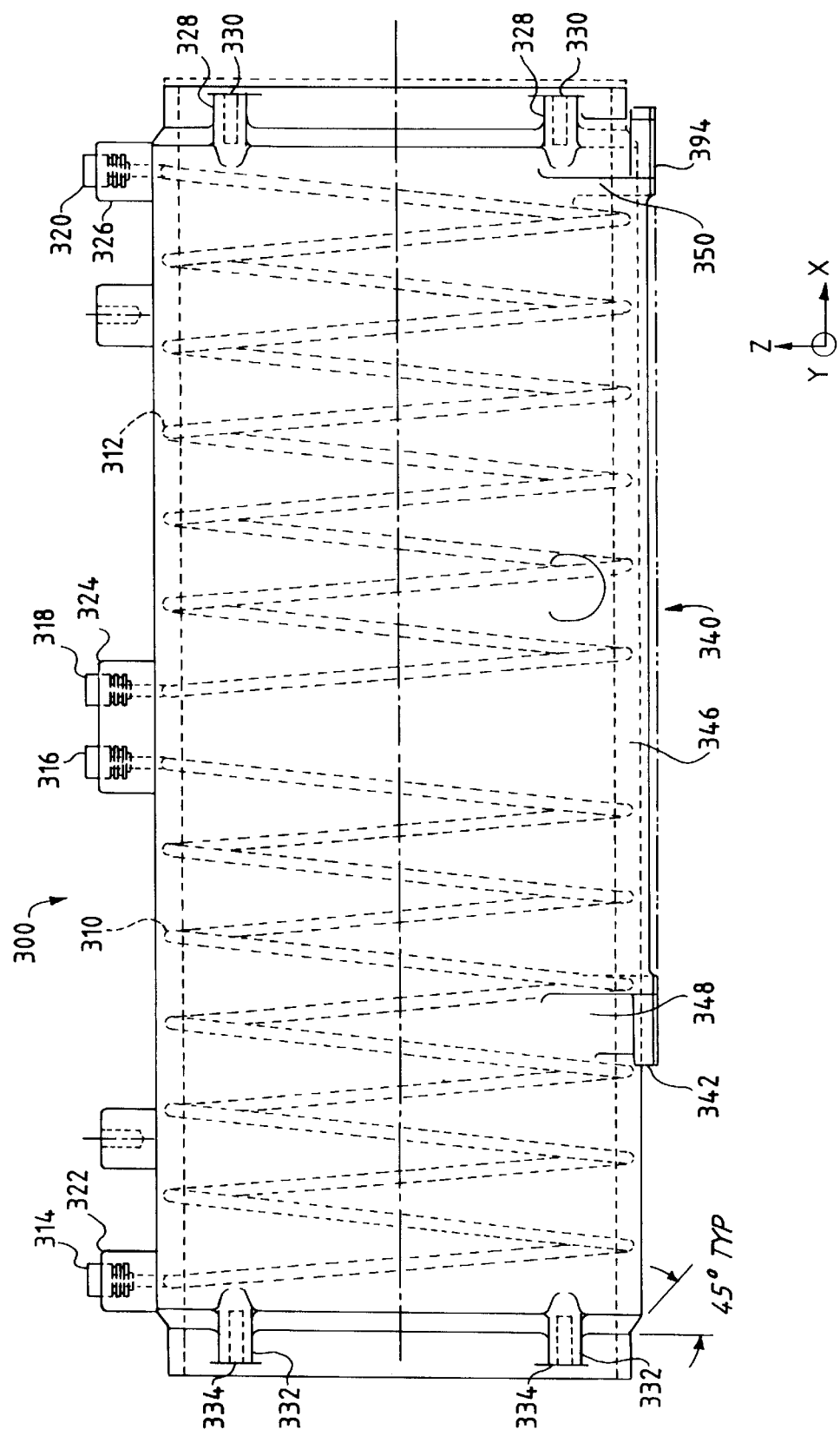
FIG. 7 is a side cross-section view of the housing of FIG. 5, taken along the view lines 7—7 thereof.
Figure 8:
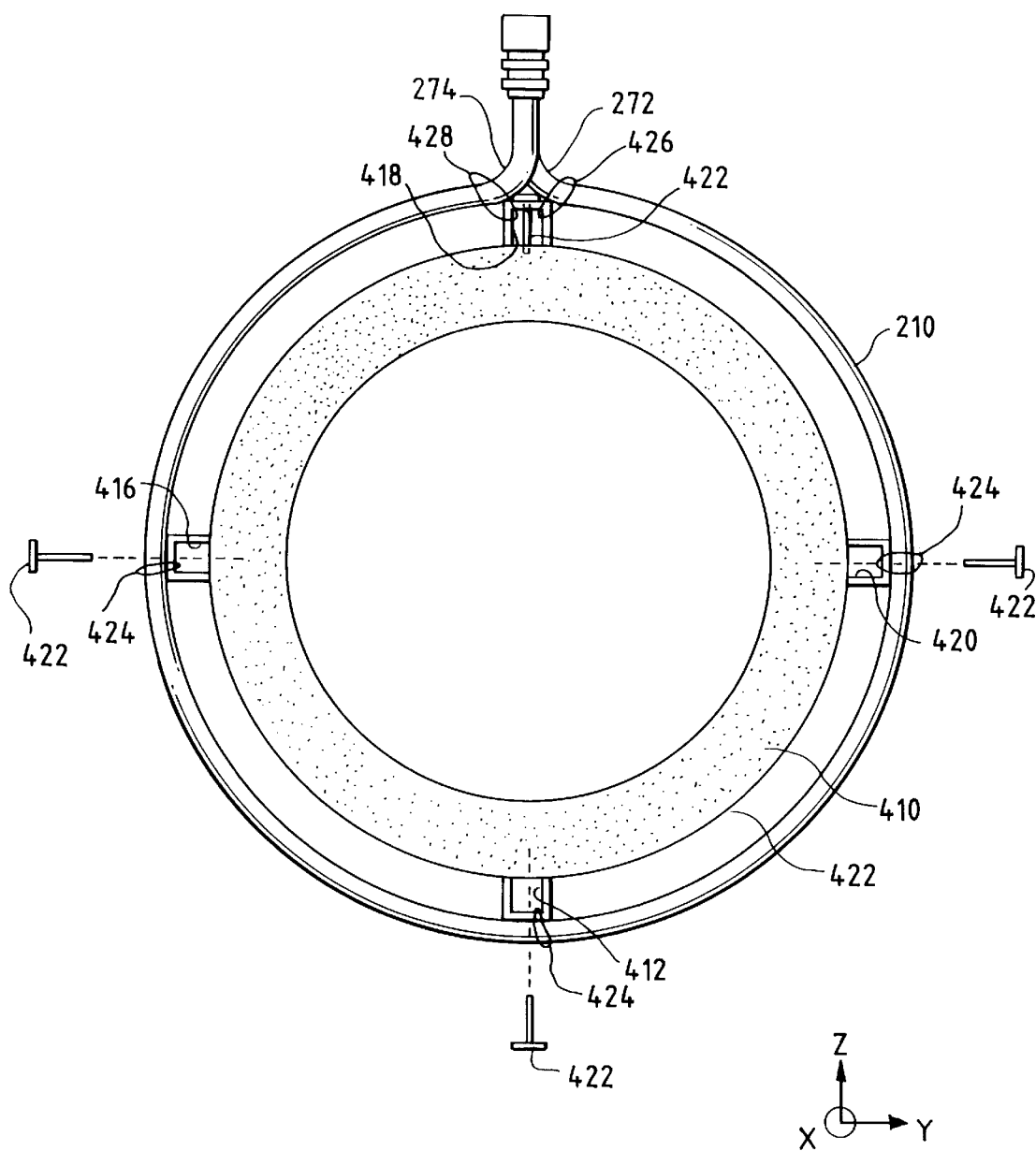
FIG. 8 is an end elevation view of a casting form constructed according to a further aspect of the present invention, for use in manufacturing the inventive housing of FIGS. 1–4, showing a heat removal conduit portion of the housing mounted on the form in an intermediate stage of manufacture.
Figure 9:
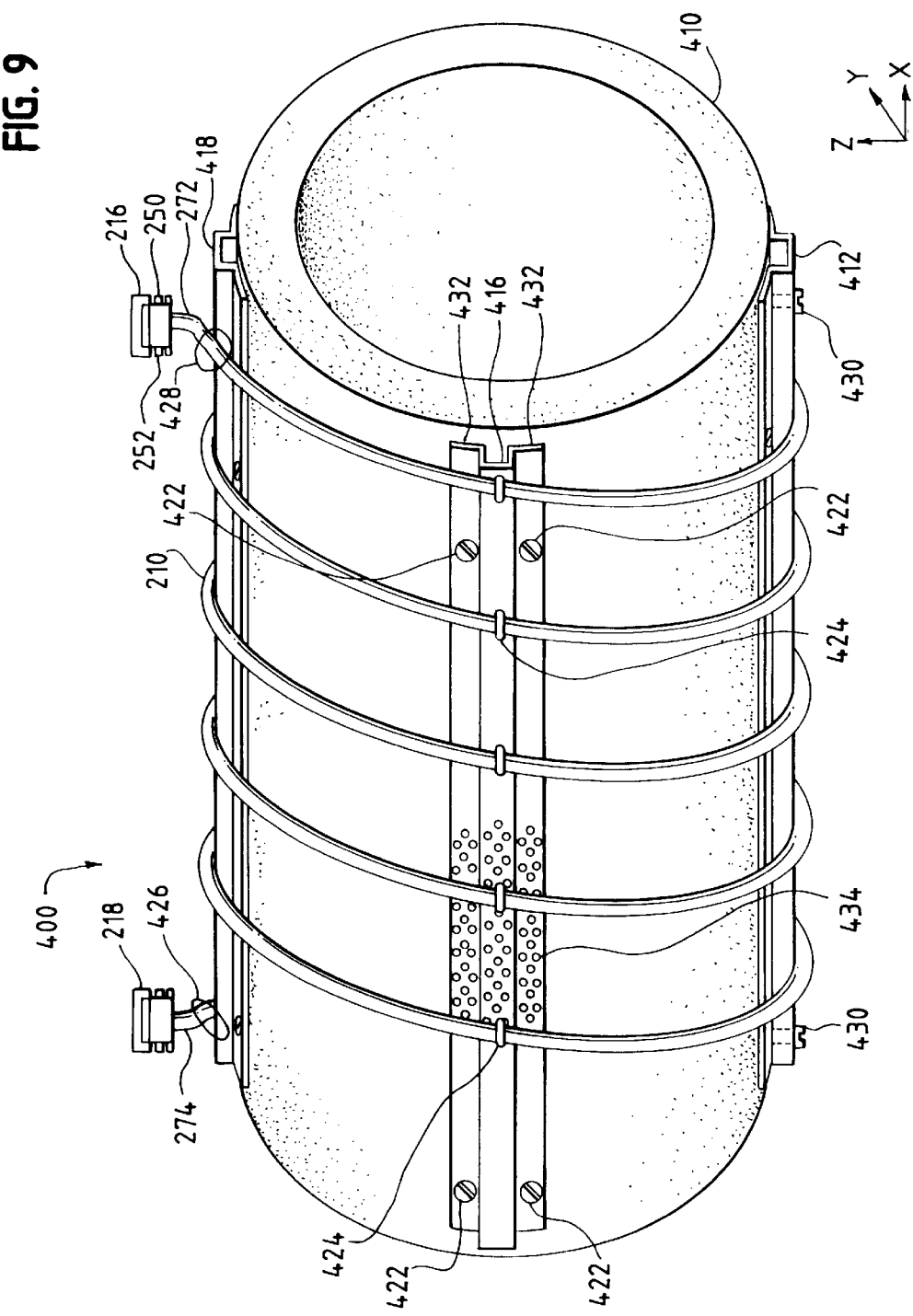
FIG. 9 is a side elevation view of the casting form and heat removal conduit of FIG. 8.
Figure 10:
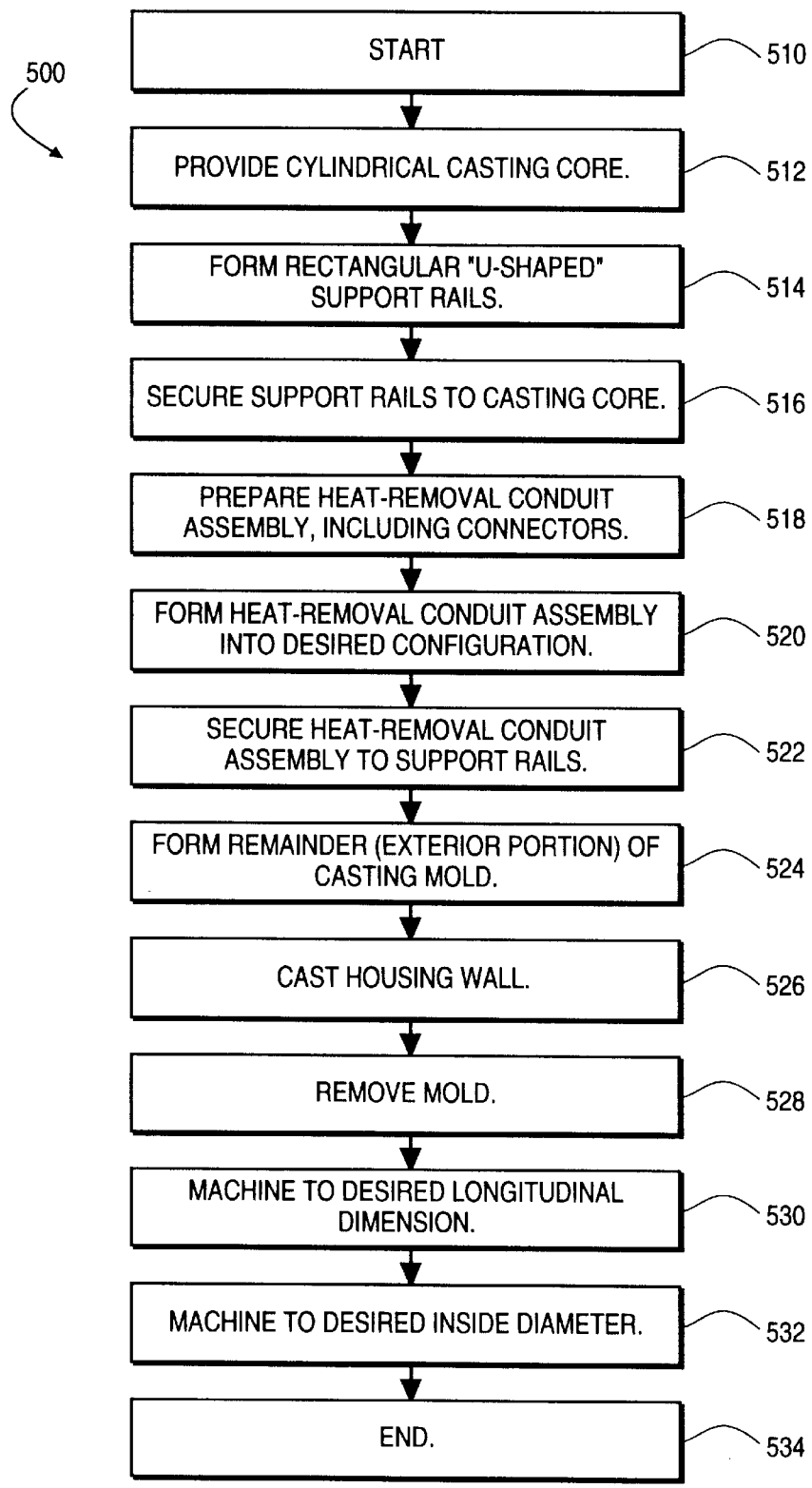
FIG. 10 is a flow diagram showing the steps of a process according to the present invention which may be used for manufacturing the inventive housings of FIGS. 1–7.

FIG. 1 shows the inventive motor housing 200 in an application environment, in which the motor housing 200 may be used to construct a motor 110 which cooperates with ancillary equipment to form an industrial drive system 100. FIGS. 2–4 show the housing 200 in greater detail. FIGS. 5–7 show a second preferred embodiment 300 of a motor housing constructed according to the present invention. According to another aspect of the invention, FIGS. 8–9 show, in part, a casting form 400 for use in constructing a motor housing having an integrated heat removal conduit, including means for supporting the conduit during casting of the housing. According to a further aspect of the invention, FIG. 10 is a flow diagram showing a method of manufacturing a housing which incorporates a heat removal conduit.

For convenient reference, a set of orthogonal coordinate axes, labeled X, Y, and Z, is defined. References herein to the X, Y, or Z directions mean a direction parallel to the respective coordinate axis.

As best seen in FIGS. 1–4, a motor housing body 200 constructed according to the present invention comprises a substantially cylindrical or annular housing wall means 208 having a first end 138, a second end 140, an exterior surface 240, an interior surface 242, and a heat removal conduit 210 disposed within the wall 208. The housing wall 208 defines a longitudinal axis 254 which is disposed concentrically with respect to the housing and parallel to the X-axis.

The cylindrical housing wall 208 further defines a substantially cylindrical cavity 136 in which various components of an electric motor 110 may be housed. The inventive housing 200 may be used with electric motors of any suitable motor technology, including, but not limited to, DC brushless motors. A typical motor 110 of this type includes a generally cylindrical stator winding 130 (FIGS. 1–2), a motor output shaft 134 mounted for rotation on first and second bearing means 152, 154, a rotor means 132 mounted on the motor output shaft 134, and shaft position encoder means 150 coupled to the motor output shaft 134. The motor output shaft 134 is mechanically coupled to a load 118. The stator winding 130 (FIGS. 1–2) may be of any conventional design, and in common practice is permanently mechanically affixed to the interior surface 242 of the housing wall 208 using a compression fit. The stator winding 130 may be considered a second body within the housing which produces undesired heat energy. End bell caps 142 and 144 are provided at each end of the motor 110 to retain the internal components and to provide a closure to prevent gross infiltration of foreign objects into the motor interior 132. The rotor means 132 may be implemented using any suitable rotor technology, including a permanent magnet rotor or a rotor winding. Additional windings (not shown) may be provided in the motor to excite the rotor means 132. Only basic components of the motor 110 are shown in the drawings, as the internal construction of motors is well known in the art.

The cylindrical housing wall 208 may be constructed of any suitable heat-conducting material having sufficient structural strength. According to an aspect of the present invention, which will be described further in greater detail, the housing wall 208 is preferably cast from an appropriate alloy of aluminum. For example, Type 319 or Type 356 aluminum alloys, which are standard products commercially available from several sources, could be used. Aluminum is mechanically sturdy, has excellent thermal conductivity, and is of low density compared to many other high-conductivity metals. Although particular materials and formation methods are disclosed herein, one of ordinary skill in the art will appreciate that many other materials could also be used. In particular, a sturdy, thermally conductive polymer material could also be used, and could be cast or otherwise formed using any appropriate method. For example, if a polymer were used, the housing could be formed using high temperature casting, room temperature casting, sintering, extrusion, or any other suitable technology.

As best seen in FIG. 4, the housing wall 208 is preferably cast to an oversized longitudinal dimension, represented by broken lines 278 and 282 (FIG. 4). The housing wall is preferably machined at each end to form first and second end faces 246 and 276 for receiving first and second end bell caps 142 and 144, respectively. The machining causes the removal of an amount of material at the first and second ends represented by dimensions E and F, respectively, and produces a housing wall 208 which conforms accurately and repeatably to a desired length.

As best seen in FIG. 3, the housing wall 208 is preferably cast such that the inner diameter of the wall 208 is undersized, as represented by the broken circle 248. The bore of the housing wall 208 is preferably machined to form an interior housing wall surface 242. The machining causes the removal of an amount of material represented by dimension C (FIG. 3), and produces a cylindrical interior housing wall surface 242 which conforms accurately and repeatably to a desired diameter and surface finish. The machining also removes certain manufacturing artifacts, including a portion of the materials used to support the heat removal conduit 210 during the casting operation. Preferably, the interior housing wall 242 is machined to a precision surface having a diameter which is selected to be close to, but smaller than, the outside diameter of the stator winding assembly 130. For example, at normal temperatures, the inner diameter of the housing wall may be 0.002 inches smaller than the outer diameter of the stator winding assembly. This relationship between diameters allows an interference fit, providing high thermal conductivity, to be formed between the interior housing wall 242 and the stator winding assembly 130 during motor assembly. The interference fit may be achieved by temporarily enlarging the inner diameter of the housing wall by thermal expansion, positioning the stator winding assembly as desired, and allowing the housing wall to contract around the winding. However, other methods of securing the stator could also be used.

The housing 200 preferably provides surface features to accommodate the mechanical attachment of end bell caps 142 and 144 and support legs (not shown) for supporting the motor 110. The housing wall 208 has four shallow longitudinally-extending channels 244 which may be equally spaced about the circumference of the wall. The channels 244 are provided to accommodate longitudinally extending tension rods 230 used for fastening the end bell caps 142 and 144 to the motor housing 200. Tension rods 230 may extend through suitable apertures 232 in the end caps and preferably have flanges 228 or other suitable retaining hardware which allow the end bell caps 142 and 144 to be compressed longitudinally against the motor housing. Tension rods 230 and flanges 228 may be implemented using conventional fasteners such as threaded rod stock and mating nuts.

The housing 200 further comprises first and second support leg mounting platforms 258 and 266. The mounting platforms are integrally cast with the housing wall 208. The mounting platforms 258 and 266 extend longitudinally along the housing wall 208. First and second mounting platforms 258, 266 have a planar vertical faces 260, 268, which extend vertically from the exterior surface 240 of the housing wall at positions 284 and 286, respectively. The platforms 258, 266 have horizontal planar surfaces for attachment to appropriate conventional motor mounting feet (not shown). The platforms 258, 266 have vertically extending apertures 256, 264 (FIG. 3) for receiving any suitable means for fastening the mounting feet to the platforms, such as conventional bolts, and the apertures 256, 264 may be tapped to retain the fasteners. Preferably, the locations of the apertures 256, 264 are selected to avoid interference with the heat removal conduit 210, as best seen in FIGS. 1 and 4. In a second preferred embodiment, motor mounting features and end bell cap retaining features are provided in different ways, which are discussed further (see FIGS. 5–7). Although particular structures for attaching mounting feet and end caps are described herein, one of ordinary skill in the art will appreciate that many aspects of the housing may be modified according to design requirements.

During assembly of the motor 110, the stator winding assembly 130 is secured in the motor housing 200 to provide in intimate, high-thermal-conductivity, friction engagement between these components. As noted previously, the inner diameter of the motor housing 200 is preferably selected to be slightly smaller than the outer diameter of the stator winding assembly 130 at normal temperatures. According to one preferred method of motor assembly, the motor housing 200 is heated to a temperature well above normal operating temperatures, causing thermal expansion of its inner wall surface. Heating produces sufficient thermal expansion that the inner diameter of the motor housing 200 temporarily becomes larger than the outer diameter of the stator winding assembly 130. The stator winding assembly 130 is then inserted into the proper position in the housing cavity 136 of the housing 200, and the housing 200 is allowed to cool to normal temperatures. As the housing 200 cools, it contracts around the stator, producing a secure compression/shrink fit engagement between the inner wall surface 242 of housing cavity 136 and the stator winding assembly 130. This process eliminates essentially all air gaps and other voids between the housing inner wall and the stator winding assembly. As a result, the interface between the stator winding assembly and the housing inner wall provides high thermal conductivity, allowing substantially all of the heat generated by the stator winding assembly to be conductively transferred from the stator to the housing wall, and then to the heat-removal fluid circulating in the conduits therein.

Heat removal conduit 210 is preferably formed using a mechanically sturdy tubing which provides an internal passage 212 for circulation of an appropriate heat-removal fluid. Any appropriate heat-removal fluid may be used. Preferably, the fluid is not excessively viscous so that it may easily circulate through conduit 210, and has sufficient heat capacity that it acts as an efficient heat carrier. For example, the fluid may be water, a suitable oil, an ethylene-glycol based coolant, a refrigerant, or other materials. A gaseous fluid may also be used if its heat capacity is great enough to achieve efficient heat transfer.

The heat removal conduit 210 is preferably any suitable, thermally conductive tubing material which is compatible with both the desired heat-removal fluid and the material of housing wall 208. In general, the heat removal conduit 210 is considered compatible with the heat-removal fluid if the fluid does not attack it chemically, if the viscosity and other flow-related characteristics of the fluid allow it to circulate through the tubing, and if the tubing is capable of holding the fluid under the pressure required to provide circulation flow. The heat removal conduit 210 is considered compatible with the housing material is there are no undesirable chemical interactions, if the thermal expansion characteristics of both are similar, and if the tubing is not adversely affected by the casting process. For example, where the housing is constructed using a high-temperature casting material, such as cast aluminum, the tubing must have a melting temperature substantially higher than that of the housing material so that the tubing retains its shape during the casting process. A preferred material for heat removal conduit 210 is Type 304 stainless steel tubing, which is a standard product commercially available from several sources. Advantageously, this material is compatible with a wide variety of heat transfer fluids. However, one of ordinary skill in the art will appreciate that many other materials could also be used.

The heat removal conduit 210 may be formed in any suitable configuration which provides adequate cooling and distributes the conduit 210 throughout the length and circumference of the housing wall 208 so that the cooling occurs evenly. The inventive housing advantageously avoids regions of uneven cooling ("hot spots") which could cause internal motor temperatures to rise, and could result in motor failure. As best seen in FIGS. 1 and 4, in a first preferred embodiment of the invention, a single heat removal conduit 210, formed as a five-turn helical coil, may be used. As best seen in FIG. 7, in a second preferred embodiment, two longitudinally adjacent heat removal conduits, each formed as six-turn helical coils, may be used. The second preferred embodiment will be discussed further in greater detail. Other configurations, such as multiple interspersed helical coils, or non-helical configurations, could also be used. As best seen in FIGS. 1, 4, and 7, the conduits may have a consistent pitch, so that consistent cooling is provided substantially along the entire length of the housing (or a predefined region of the housing to which cooling will be provided). However, in some applications, it may be desirable to vary the pitch of the conduit to provide enhanced cooling to selected regions.

The radial position of the heat removal conduit 210 is preferably selected so that adequate cooling is achieved, the structural integrity of the housing wall 208 is not impaired, and any modifications to the cylindrical cross-section of the housing wall 208 do not expose or interfere with the conduit 210. Subject to this constraint, although the housing wall 208, and the exterior surface 240 of housing wall 208, are described herein and shown in the drawings as generally cylindrical, any suitable exterior cross-section or configuration could also be used. For example, the housing wall could also have a square, hexagonal, or octagonal cross section, or any other suitable shape. The conduit 210 may be positioned approximately midway between the nominal positions of the interior wall surface 242 and the exterior wall surface 240. A dimension "D" represents the radial distance between the machined interior wall surface 242 of the housing wall and the inner diameter of the helical coil formed by the heat removal conduit 210. Tension rod channels 244 have a radial inward depth A which is selected such that a sufficient radial thickness B remains beyond the outer wall of the conduit 210. In an embodiment having a housing wall inside diameter of approximately 7.5 inches, a housing wall thickness of approximately 0.66 inches, and a heat removal conduit outside diameter of 0.25 inches an appropriate dimension A may be ⅛ inch, an appropriate dimension B may be 1/16 inch, and an appropriate dimension D may be 0.22 inches.

Heat removal conduit 210 is preferably sized so that adequate circulation of heat removal fluid can be established, but the presence of the conduit 210 does not significantly degrade the structural integrity of the housing 200. The proper size of the heat removal conduit 210 may vary according to the heat removal fluid selected, the overall radial thickness of the housing wall 208, and the configuration of the conduit 210 in the wall. In typical applications, the conduit outside diameter may range from approximately 0.125 inches to 0.500 inches, and the conduit wall thickness may vary from approximately 0.015–0.030 inches. In embodiments having housing wall thicknesses of 0.625 in to 1.250 in, employing five- or six-turn helical coil configurations, and using water or ethylene glycol coolants, a heat removal conduit 210 having an outside diameter of 0.25 in, and a conduit wall thickness of 0.025 inches is believed to be suitable. Although exemplary dimensions for certain aspects of the housing are provided, one of ordinary skill in the art will appreciate how a housing constructed according to the present invention may be widely scaled in size according to design requirements.

Heat removal conduit 210 preferably has suitable input and output connections to allow circulation of the heat removal fluid through the motor housing 200 and an external heat exchanger 114 (FIG. 1) so that waste heat 126 (FIG. 1) absorbed by the heat removal fluid in the motor 110 may be expelled. For example, the heat removal conduit 210 may have an input connector 216 and an output connector 218 extending radially from the housing wall 208 at first and second longitudinal ends thereof 138 and 140 respectively. Connectors 216 and 218 may be any suitable fittings which are compatible with conduit 210 and other system components. For example, connectors 216 and 218 may be constructed from suitable bar stock or the like, by cutting the stock to a suitable exterior configuration, forming a central aperture, and forming threads on the interior of the central aperture, using screw-machine techniques well known in the art. Any appropriate thread configuration may be used. For example, standard "NPT" (National Pipe Thread) threads, having a tapered thread configuration, may be used to provide excellent sealing performance when a mating connector is used. Although particular structures the connectors 216 and 218 are described, one of ordinary skill in the art will appreciate that the configuration of the connectors may be modified according to design requirements. Further, a variety of suitable commercially available connectors could also be used in this application.

The fittings 216 and 218 may be attached to the conduit 210 using any suitable fastening means or method, such as welding. As best seen in FIGS. 3, 4, and 9, the transitions 272 and 274 from the helical portion to the radially extending portions of the conduit 210 are formed as controlled-radius bends to avoid crimping or otherwise damaging the conduit.

First and second radially-extending monuments 146 and 148 are provided for supporting and protecting the input and output connectors 216 and 218, respectively. The monuments 146 and 148 are formed as extensions of the housing wall 208 at the time the wall is cast by providing suitable mold structures. The connectors 216 and 218 preferably have striated base portions 250, 252 which securely anchor the connectors 216 and 218 in the monuments 146, 148. One or more notches, flat sections, or key ways 298 may be provided on the striations to prevent rotation of the fittings with respect to their supporting monuments.

FIG. 1 shows the inventive motor housing 200 in an application environment, in which the motor housing 200 may be used to construct a motor 110 which cooperates with ancillary equipment to form an industrial drive system 100. The industrial drive system 100 comprises motor 110, a load 118 mechanically coupled to the motor 110, a motor power supply and controller 112 electrically connected to the motor 110 and a commercial power source 156, a heat exchanger 114 for receiving the heat removal fluid warmed in the motor 112, and a pump 116 for circulating the fluid. In operation, motor controller 112 receives electrical power from commercial source 156 and supplies appropriate drive signals 160 to the motor stator winding 130. The motor controller 112 may also provide drive signals (not shown) to additional excitation windings (not shown). The motor controller 112 generates the drive signals 160 in response to motor speed control components 162 and 164, and in response to motor speed signals 158 obtained from motor shaft position encoder 150, using methods well known in the art.

In the motor cooling system 120, a circulation pump 116 draws cool fluid from heat exchanger 114 through a conduit 176 and supplies it under pressure to the motor heat removal conduit 210 via conduit 178 and input connector 216. The fluid circulates through the heat removal conduit 210 and absorbs I heat produced in the motor. The heated fluid exits the heat removal conduit 210 through output connector 218 and travels through conduits 170, 172, and 174 to heat exchanger 114. In the heat exchanger 114, waste heat 126 is removed from the heat removal fluid and expelled, and the cooled heat removal fluid is recirculated. Temperature switch 124 and pressure switch 122 may be used to provide signals 168 and 166, respectively, to the motor controller 112. If a cooling system malfunction, such as a coolant leak or excessive temperature, is detected, the motor controller 112 can responsively stop the motor 110 before damage occurs.

FIGS. 5–7 show a second preferred embodiment 300 of a motor housing constructed according to the present invention. Because the second preferred embodiment 300 is highly similar to the first preferred embodiment 200, only those aspects which differ are discussed herein.

In general, larger capacity motors produce more heat. Although it may be possible to adequately cool a large capacity motor with a single, long heat removal conduit, the temperature of the heat removal fluid increases as the fluid travels through the conduit absorbing heat. By the time the fluid reaches the output port of the conduit, its temperature may have increased sufficiently that it no longer provides as much cooling as desired, or the temperature differential between the housing regions near the input connection and the housing regions near the output connection is undesirably high. It may be possible to cure these problems by increasing the flow rate of the heat-removal fluid, but increasing the flow rate may require undesirably high fluid pressure or an undesirable increase in the size of the conduit.

Accordingly, motor housing 300 comprises first and second longitudinally adjacent heat removal conduits 310 and 312. Conduits 310 and 312 are each formed in a six-turn helical configuration, although other configurations could also be used. For example, several helical conduits may be interspersed with one another (for example, in a "double-helix" configuration similar to the structure of DNA). Non-helical configurations may also be used. The conduits may have a consistent pitch, or the pitch may be varied to provide enhanced cooling to selected regions.

The use of two conduits 310 and 312 provides additional heat removal capacity without requiring higher pressures or larger conduit diameters. The first and second conduits 310 and 312 may operate in parallel. That is, cooler fluid may be simultaneously supplied to input connectors 316 and 318, and heated fluid may be withdrawn from output connectors 314 and 320. Output connectors 314 and 320 are supported by monuments 322 and 326, respectively, Input connectors 316 and 318, which are adjacent, may be supported by a single enlarged monument 324.

Motor housing 300 further comprises modified means for the attachment of motor end bell caps (not shown) directly to the housing wall. At each longitudinal end of the housing, a plurality of fastener socket blisters 328, and 332 are respectively provided to support the end bell caps. The blisters 328 and 332 have fastener sockets 330 and 334, respectively, for receiving any suitable fasteners (not shown) extending through and securing the end bell caps. For example, the fasteners may be conventional bolts or screws, and the sockets 330 and 334 may have mating threads or other means for retaining the fasteners. Other fastening means could be used.

Motor housing 300 also comprises first and second motor support feet 340 which are preferably integrally cast with the housing wall. The support feet 340 extend longitudinally along the housing, and also extend transversely from the housing to maintain the housing in a desired orientation. Each support foot 340 has a longitudinally extending bridge member 346 which spans first and second support members 348 and 350. The first and second support members 348, 350 extend almost radially from the housing wall, forming buttresses between the wall and the bridge member 346. Motor mounting pads 342 and 344 descend from the bridge member 346 to provide well defined contact surfaces. Equipment in which the motor is installed preferably provides structural supports in corresponding locations.

According to another aspect of the present invention, FIGS. 8–9 show a casting form 400 which may be used in manufacturing the inventive motor housing 200 of FIGS. 1–4. The casting form 400 comprises a substantially cylindrical casting core 410, a pre-assembled heat removal conduit 210 of the type used in housing 200, and a plurality of support rails or chaplets 412, 416, 418, and 420 for securing the heat removal conduit 210 in desired fixed relationship, both longitudinally and radially, with respect to the core 410. Core 410 essentially forms the inner portion of a mold for casting the motor housing 200. The remaining (outer) portion of the mold is not shown, but it may be constructed using any suitable conventional techniques. The inner and outer portions cooperate to form a complete mold for casting the motor housing 200. The exterior surface of core 410 defines the inner cast diameter 248 of the housing 200 (see FIG. 3). Core 410 may be constructed of any suitable high-temperature-resistant material, such as casting sand. Alternatively, the motor housing may be formed using other casting methods, including those which employ a permanent mold, or could be constructed using any other suitable methods.

The support rails or chaplets 412, 416, 418, and 420 secure the heat removal conduit 210 during casting. The support rails control the longitudinal position of the conduit 210 to avoid shifting, warping, and other aberrations which may otherwise occur due to the high temperature differentials present during casting. The support rails also control the spacing of the conduit 210 with respect to the core 410, and therefore, ultimately control the radial position of the conduit 210 within the cast housing wall 208.

The support rails 412, 416, 418, and 420 extend longitudinally along the outer surface of the core 410 and are preferably spaced evenly about the circumference of the core 410. Although four support rails are shown and described herein, a different number of support rails could be used. In particular, for larger diameter housing walls, more support rails may be needed to ensure control of the position of the conduit 210 during casting. Support rails 412, 416, 418, and 420 are preferably formed as rectangular "U-shaped" channel members with the concave portion of the "U" facing the core 410.

The support rails 412, 416, 418, and 420 are preferably formed from a suitable sturdy material having thermal expansion characteristics similar to that of the casting metal, but that is otherwise unaffected by the casting process. Where the housing is constructed using a high-temperature casting material, such as aluminum, the rails must be formed from a material having a melting temperature substantially higher than that of the casting metal so that the support rails retain their shape during the casting process. A suitable material for constructing support rails 412, 416, 418, and 420 is mild steel perforated sheet, which is commercially available from several sources. The support rails preferably have a plurality of perforations 434. The perforations 434 allow the casting metal to penetrate the interior of the support rails, thereby preventing voids in the housing wall.

The conduit 210 is secured to the support rails using any conventional fastening means. For example, at each location where the conduit 210 passes one of the support rails, the conduit 210 may be tied to the rail with a piece of conventional wire extending through the perforations, such as wire fasteners 424, 426, and 428. Other fastening means could also be used. The support rails may be secured to the core 410 using any suitable conventional fasteners, such as nails. For example, support rails 412, 416, 418, 420 are shown secured to the core 410 using nails 422 extending through the channel section of the rails into the core 410. One of ordinary skill in the art will appreciate that a variety of other suitable means could also be used to secure the conduit 210 during casting of the housing, and where support rails are used for this purpose, other means could be used to fasten the support rails to the core 410.

Although the casting form 400 has been discussed in conjunction with the first preferred embodiment 200, a similar, but larger form may be used to construct the motor housing of the second preferred embodiment 300. Of course, first and second heat removal conduit assemblies must be disposed longitudinally adjacent one another on the casting core.

FIG. 10 is a flow diagram showing a method 500 according to a further aspect of the present invention for constructing a motor housing having integrated therein a heat removal conduit. The method begins in step 510 in which suitable materials for constructing the housing are obtained. In step 512, a suitable cylindrical casting core (e.g., core 410 of FIGS. 8–9) is formed. In step 514, rectangular "U-shaped" support rails are formed having the desired height and length for supporting and controlling the position of a heat removal conduit. In step 516, the formed support rails are secured to the exterior of the casting core.

In step 518, a heat removal conduit assembly is constructed by preparing a desired length of suitable tubing and attaching the input and output connectors thereto. In step 520, the heat removal conduit assembly is formed into the desired configuration, such as a helix. In step 522, the heat removal conduit assembly is attached to the support rails. In step 524, the remainder (i.e., the exterior portion) of the casting mold is formed and placed in a desired position for casting. In step 526, the casting material is poured into the mold. In step 528, the mold is removed, and the casting is cleaned and prepared for machining. In step 530, the casting is machined to the desired longitudinal dimension. In step 532, the casting if further machined to the desired inner diameter. In step 534, the method is completed by applying any necessary finishing operations.

Thus, according to the invention, an improved motor housing and construction method therefor has been disclosed which provides numerous advantages over the prior art techniques for cooling motors and other heat producing machines. The inventive housing advantageously provides improved cooling for DC brushless motors (or other machines) and avoids the problems experienced using prior-art forced-air and liquid cooling methods. As a result of the high-thermal-conductivity interfaces between the stator winding assembly and the housing wall, and between the housing wall material to the heat-removal conduit and circulating fluid, the inventive motor housing advantageously provides very high cooling rates compared to prior art housings. Motors produced using the inventive housing operate at lower external and internal temperatures, improving operator safety, motor reliability and lifespan. Such motors may be cooled remotely and may be applied in higher density applications.

Drive systems, motors, and or other heat producing machines produced with housings constructed according to the present invention advantageously avoid the need for high-velocity cooling blowers in the vicinity of the equipment. The invention thus eliminates the noise pollution, dust and particulate contamination, and occupational safety hazards associated with the blowers. The invention further provides a housing which may be used in environments in which a blower-cooled motor would be undesirable. For example, in applications where an explosive atmosphere renders a high-velocity blower a safety hazard, elimination of blowers may eliminate or ameliorate the hazard. Because the invention eliminates the need for forced air cooling in the vicinity of the motor, a large space are not required around the motor to allow air circulation. As a result, motors produced according to the invention may be packed more tightly in equipment, reducing the size and cost of the equipment. The invention also advantageously eliminates the need for cooling fins on the exterior of the motor housing, further reducing the space requirements and material cost of the motor.

Unlike some prior art external cooling jackets, the inventive housing, including the heat-removal conduit, is constructed as an integrated unit. This advantageously eliminates the need to install a cooling jacket around the motor housing after the housing is manufactured. Further, because the heat removal conduit is formed as an integral part of the housing, the invention provides a high-thermal-conductivity path between the housing and the heat removal fluid. This eliminates the problem of the prior art external cooling jackets, in which a high-thermal-conductivity interface between the motor housing and the cooling jacket was difficult or impossible to achieve. Another advantage of the invention is that the exterior shape of the housing need not be limited to those on which an external cooling jacket may be conveniently installed.

Further, because the housing itself is constructed essentially as a single piece, it retains its structural integrity, and it is compatible with preferred techniques of constructing brushless DC motors, in which a stator winding assembly is secured in the the housing using a high-compression interference fit. The invention thus provides significant advantages over prior-art multiple-piece or clam-shell type housings, because there is no need to tightly fasten plural non-cylindrical structural members to form a cylindrical structure for securing the stator winding and other components.

The inventive housing does not suffer from degraded structural integrity because the conduit is small compared to the housing wall thickness and is disposed within the interior and exterior housing wall surfaces at an intermediate, non-structurally critical location. The preformed, sturdy conduit with standard external connections minimizes leakage of coolant and avoids the need for large circumferential seals applied to the inner surface of the housing. The housing is relatively easy to manufacture.

According to the invention, the helical design of the conduit provides consistent cooling along essentially the entire length and circumference of the housing (or of a predefined subregion of the housing which is to be cooled). Thus, the inventive housing advantageously avoids regions of uneven cooling ("hot spots") which could cause internal motor temperatures to rise, and could result in motor failure. Because the conduit provides such large heat removal capacity, and is located at an intermediate position within the housing wall, it is generally not necessary for the outer portion of the housing wall (i.e., that portion radially outside the cylinder formed by the conduit) to conduct a substantial amount of heat. Thus, the invention advantageously provides a housing which may have an external shape selected substantially without regard to cooling requirements. Accordingly, the exterior shape or configuration may be any suitable shape or cross-section, including cylindrical, square, hexagonal, octagonal cross sections, without degrading cooling performance.

The above-described embodiments of the invention are merely examples of ways in which the invention may be carried out. Other ways may also be possible, Those who are skilled in the art will readily perceive how to modify the invention. Therefore, the following claims defining the invention are to be construed to cover all equivalent structures which fall within the true scope and spirit of the invention.

What is claimed is:

1. In electric machinery having a rotor and a stator, a thermally conductive structural housing for said machinery, which housing supports the stator and incorporates a coolant conduit, and in which said conduit existed before said housing, and said housing was cast by pouring housing material into a mold form enclosing said conduit, after which said housing material hardened with said conduit embedded therein and in intimate thermal contact therewith for heat transfer purposes.

2. In an electric motor having a rotor and a stator, a thermally conductive structural housing for said electric motor which supports the stator, and a cooling fluid conduit which is initially separate from said housing, said housing being cast by pouring flowable material into a form which encloses said conduit so that said conduit is ultimately embedded within the body of said housing and in intimate thermal contact therewith for heat transfer purposes.

* * * * *